United States Patent [19]

Hutchins et al.

[11] Patent Number: 4,987,519

[45] Date of Patent: Jan. 22, 1991

[54] HERMETICALLY SEALED ALUMINUM ELECTROLYTIC CAPACITOR

[75] Inventors: Clinton E. Hutchins, Pownal, Vt.; Eugene W. Kuzia, Adams, Mass.; Phyllis M. Schmidt; Walter W. Schroeder, both of Williamstown, Mass.

[73] Assignee: Sprague Electric Company, North Adams, Mass.

[21] Appl. No.: 498,781

[22] Filed: Mar. 26, 1990

[51] Int. Cl.⁵ .......................... H01G 9/10; H01G 7/00
[52] U.S. Cl. .................................... 361/518; 29/25.03
[58] Field of Search ...................... 29/25.03; 361/518; 174/152 GM

[56] References Cited

U.S. PATENT DOCUMENTS

| | | | |
|---|---|---|---|
| 3,321,675 | 5/1967 | Diggens | 361/518 |
| 3,522,489 | 8/1970 | Sparrow et al. | 361/518 |
| 3,568,009 | 3/1971 | Rappaport | 361/518 |
| 3,600,017 | 8/1971 | Scherer | 361/518 |
| 3,628,104 | 12/1971 | Markarian et al. | 361/518 |
| 4,296,458 | 10/1981 | Smith et al. | 361/518 |
| 4,683,516 | 7/1987 | Miller | 361/518 |
| 4,707,424 | 11/1987 | Bowsky et al. | 174/152 G M X |

*Primary Examiner*—Donald A. Griffin

[57] ABSTRACT

An aluminum electrolytic capacitor is housed in an aluminum can having one open end. A standard glass-to-metal seal having an outer tantalum ring is seated snugly within the mouth of the can. With the edge of the tantalum ring positioned flush with, or slightly below, the lip of the aluminum can, the beam of a pulsing infra red laser is directed at the interface between the tantalum ring of the seal and the aluminum lip of the can causing the lip of the can to melt, to flow over and to form a continuous annular Al-Ta weld with the tantalum ring and to hermetically seal the ring to the can continuously and completely at a peripheral edge of the tantalum ring.

7 Claims, 1 Drawing Sheet

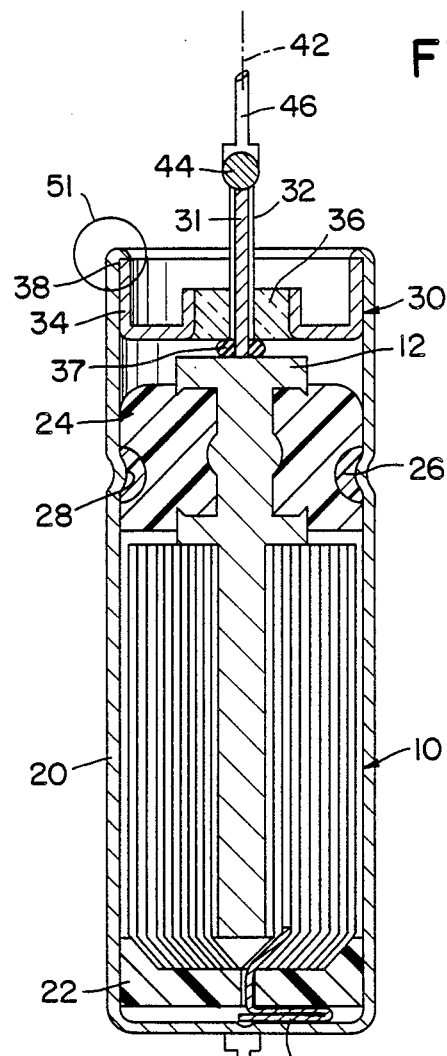
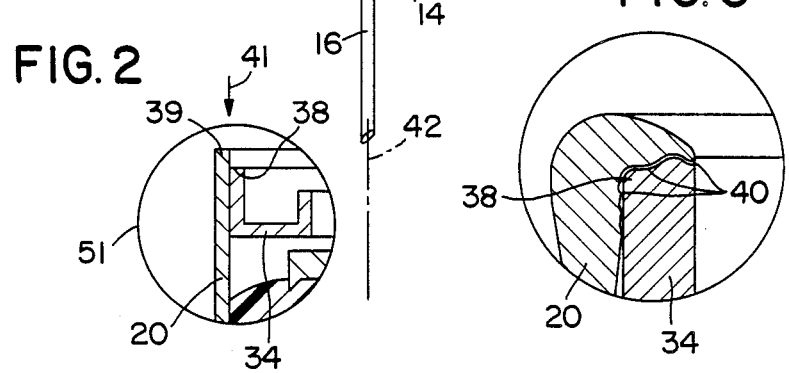
FIG. 1
FIG. 2
FIG. 3

HERMETICALLY SEALED ALUMINUM ELECTROLYTIC CAPACITOR

BACKGROUND OF THE INVENTION

This invention relates to aluminum electrolytic capacitors and more particularly to such capacitors that are packaged in an aluminum can which is closed at one end by a glass-to-metal seal.

Although it has long been recognized that the most hermetic and reliable end seals for electrolytic capacitor packages are glass-to-metal seals, aluminum electrolytic capacitors are essentially always enclosed in an aluminum can which is closed by an end seal comprised of a metal anode tab or wire surrounded by plastic and elastomeric insulating materials. The can itself may provide electrical access to the cathode of the capacitor section.

The prior art attempts at providing a hermetically sealed aluminum electrolytic capacitor have not been successful because no seal glass has been developed to be compatible with the materials of the seal ring and the aluminum capacitor elements and can. Some of the problems of a glass-to-aluminum seal are set forth by Sparrow et al in U.S. Pat. No. 3,522,489 issued Aug. 4, 1970 which discloses an attempt to solve those problems.

Another prior art attempt is shown by Markarian et al in U.S. Pat. No. 3,628,104 issued Dec. 14, 1971 wherein two glass-to-metal seals provide an aluminum electrolytic capacitor section that electrically floats in a sleeve of the same metal that is used for the seal ring. A cylindrical stainless steel casing sleeve is closed at either end by welding it, respectively, to the outer stainless steel rings of the two glass-to-metal seals. The use of two seals avoids the problem of connecting the cathode of the capacitor section to a different metal than aluminum (stainless steel). Such a different metal connected inside the package to the aluminum cathode to eliminate one seal, although weldable to the stainless steel, would be subject to galvanic corrosion and ultimate failure. Also the stainless steel sleeve is readily welded to the stainless steel outer seal ring.

The primary object of this invention is to provide an aluminum electrolytic capacitor enclosed in a true hermetic package using only one hermetic end seal.

It is another object of this invention to provide such a capacitor housed in an aluminum can to minimize cost and to entirely obviate bimetal galvanic corrosion in the electrical connection to the cathode.

SUMMARY OF THE INVENTION

A hermetically sealed aluminum electrolytic capacitor includes a capacitor section having an aluminum anode in contact with an electrolyte. The capacitor section is contained by an aluminum can having only one open end. A glass-to-metal seal having a tantalum outer ring is fitted inside the open mouth of the can. The tantalum outer ring is sealed to the aluminum mouth of the can by a continuous aluminum-tantalum weld having been formed by a laser.

Forming aluminum-tantalum welds, and more particularly forming continuous Al-Ta welds, is especially forbidding owing to the great disparity of the melting temperatures of these two metals. Aluminum melts at 660° C. whereas the melting temperature of tantalum is almost 3000° C., and aluminum boils at 2500° C.

It has been discovered that aluminum-tantalum welds are readily formed by directing a laser at the interface between abutting aluminum and tantalum parts. The best welds are obtained using a laser energy that is nearly as great as that which is optimum for welding two abutting tantalum parts.

It has been discovered that the best Al-Ta welds are realized by setting the tantalum ring of the seal to a recessed position a few mils deeper into the can with respect to the lip of the aluminum can. The few mils extension of aluminum, beyond the peripheral edge of the tantalum ring, melts at welding and flows over a portion of the tantalum surface adjacent the peripheral edge of the ring. The large weld area so created has an annular geometry similar to a washer and is only a few microns thick. This thin weld extends between the flowed aluminum and the underlying portion of tantalum ring surfaces. Although starting with the tantalum ring flush with the lip of the aluminum can at welding, some flow of aluminum over the tantalum edge often results. However, it is preferred to position the aluminum can lip to the above-noted condition beyond the tantalum ring, in preparation for laser welding in the interest of less criticality and greater reliability.

BRIEF DESCRIPTION OF THE DRAWING

FIG. 1 shows, in side cross-sectional view, a hermetically sealed aluminum electrolytic capacitor of this invention.

FIG. 2 shows, in side sectional view, a detail portion 51 illustrating the relative positioning of the tantalum seal ring and the lip of the aluminum can just prior to the welding step in the manufacture of the capacitor of FIG. 1.

FIG. 3 shows, in magnified side sectional view, a portion of the detail 51 that includes a section of the weld between tantalum ring of the end seal and the aluminum can.

DESCRIPTION OF THE PREFERRED EMBODIMENTS

Referring to the drawing which illustrates a preferred embodiment of the invention, there is shown an aluminum electrolytic capacitor having a standard rolled aluminum capacitor section 10. Section 10 is comprised of a pair of anodized sheets of aluminum with layers of a porous paper interleaved between them.

The stack of aluminum sheets and paper is wound about an aluminum mandrel 12 that extends outwardly beyond one end of the section 10. At winding, one of the aluminum sheets that will serve as the anode is attached to the aluminum mandrel 12. An aluminum strip or cathode tab 14, with one end welded to the other of the aluminum sheets, extends from the other end of the rolled section 10. The section 10 is impregnated with a standard electrolyte based upon dimethylformamide. The other and distal end of the aluminum tab 14 is welded to the inside bottom surface of the cylindrical aluminum can 20. A solderable tinned-copper cathode lead wire 16 has one end welded to the outside bottom of can 20. There is thus provided internal to the can an all-aluminum electrical access to the aluminum cathode sheet of the wound capacitor section 10 to the can 20.

The capacitor section 10 is contained by the deep drawn aluminum can 20. The bottom of the section 10 is held and prevented from moving relative to can 20 by a close fitting fluoro-plastic seating element 22. The top end of the section 10 is held fixed relative to the can 20 by a fluoro-plastic member 24 that snugly surrounds an upper portion of the aluminum mandrel 12. The annular plastic member 24 is encircled by a rubber O-ring 26.

Preparing for assembly of the capacitor section 10 in can 20, the cathode tab 14 is threaded through a hole in the center of the plastic member 22, and the distal end of cathode tab 14 is welded to the bottom of can 20. This tab 14 must be much longer than indicated in FIG. 1, and contain more folds, in order that its attachment to the can 20 be made prior to inserting section 10 in the can 20. The capacitor section 10 is pushed into the can 20 thereby folding the long tab 14 and seating the capacitor section 10 against the plastic seating member 22 and the bottom of the can 20. An anodized tantalum anode riser wire 31 has one end percussion-weld bonded to the aluminum mandrel 12, the distal end of riser wire 31 extending axially away from the capacitor section. The can 20 is then spun forming an inwardly directed annular bead 28 that deforms and seals the annular plastic member 24 and rubber O-ring 28 against the can 20. This inner seal system all but prevents electrolyte of section 10 from creeping or diffusing by the walls of the container 20 and along the inner surface of the glass-to-metal end-seal 30.

A glass-to-metal end seal 30 is comprised of coaxially arranged parts; namely, a tantalum tube 32, an annular glass member 36 surrounding and bonded to the tube 32, and an outer tantalum ring 34 bonded to the glass member 36.

Assembly of the glass-to-metal seal 30 to the can follows. A small ring 37 of butyl rubber or the like is placed around the riser wire 31. The seal 30 is advanced toward the open mouth of the can 20 so as to thread and push the anode riser wire 31 into the tube 32. The glass-to-metal seal 30 is then pushed into the mouth of the can 20 compressing the elastomeric ring 37 against the mandrel 12. This whole assembly is essentially symmetrical about the capacitor axis 42.

Referring to FIG. 2, a pulsed laser (not shown) is oriented in an axial direction 41 with respect to the axis 42 of the can 20 to direct the laser beam at the interface between the aluminum can lip 39 and the tantalum ring 34. The beam is caused to travel along this interface while the laser is repetitively pulsed to form a continuous weld 40 along the aluminum-tantalum interface as shown in FIG. 3. This may be accomplished by holding the laser beam fixed and rotating the can, or visa versa. It is preferred to maintain an inert atmosphere about the seal during welding to avoid oxidation of the aluminum and tantalum in the region of the weld, e.g. by flooding with argon or another inert gas.

The laser that was used is a pulsed infra red glass laser Model No. 14 supplied by Coherent General, Sturbridge, Mass. The tantalum seal ring has an outer circumference of 27 mm. The can and seal assembly is rotated during welding, at 1/24 revolution per second. Pulsing at a rate of one pulse per second, the welder generates a 26 pulse burst for forming the annular weld in one capacitor package. The 26 pulses allows for a two-weld-pulses overlap beyond 360 degrees rotation of the can.

The riser wire 31 is subsequently cut off about flush with the end of the tube 32 and a weld 44 joins and seals them together. An end of a solderable anode lead wire 46 is then connected to the weld 44 to provide electrical access to the capacitor-section anode.

Although good aluminum-tantalum welds are obtained by first seating the seal 30 so that the aluminum lip 39 and tantalum 30 are mutually flush, the weld-preparation procedure wherein the aluminum lip 39 extends axially beyond the tantalum edge 38 results, during welding, in melting the aluminum lip 39, flowing this excess of aluminum over the hot tantalum edge 38 and forming a more extensive weld interface area than the flush seating structure will allow. Metallurgical examination of this Al/Ta interface surprisingly reveals a true Al-Ta weld 40 of uniform thickness (on the order of 10 microns) adjacent the tantalum edge 38 between the flowed aluminum and underlying portion of the tantalum ring 30 as shown in FIG. 3.

It is believed that an important factor leading to this tantalum to aluminum weld is the much higher reflectivity of aluminum compared to that of tantalum. Thus for a given amount of infra red irradiation, the tantalum would tend to absorb more energy than the aluminum. The melted aluminum conforms to the adjacent unmelted tantalum surface and the thin Ta-Al weld formed therebetween likely occurs by solid state diffusion of aluminum into the tantalum surface. Since the appearance (in the visible spectrum) of the tantalum is much darker than the aluminum, it is believed that lasers producing radiation of other wavelengths could also be used to form this extensive Al-Ta sealing weld, though infra red lasers of comparable radiation output energy produce many times more heat and are preferred.

There is no reason to doubt that a continuous beam welder would work as well in principle, however, pulse welding is preferred for its ease of adjustment in heat delivery rate and capability for starting and stopping on command.

What is claimed is:

1. A hermetically sealed aluminum electrolytic capacitor comprising a capacitor section having an aluminum anode and a liquid electrolyte, an aluminum can having one open end and one closed end, said can containing said capacitor section and said electrolyte, a glass-to-metal seal having a tantalum outer ring, said seal snugly fitted into and closing said open end, said tantalum ring being completely sealed to said aluminum can by a continuous annular laser weld.

2. The hermetically sealed aluminum electrolytic capacitor of claim 1 wherein a portion of the lip of said aluminum can has been melted at welding and flowed over an adjacent peripheral portion of said tantalum ring conforming intimately therewith.

3. The hermetically sealed aluminum electrolytic capacitor of claim 2 wherein said weld consists of a thin intermetallic Al-Ta layer at the interface of said reflowed aluminum can-lip and a peripheral portion of said tantalum ring.

4. The hermetically sealed aluminum electrolytic capacitor of claim 1 wherein said section includes an aluminum cathode in contact with said electrolyte, and said cathode is conductively connected to the inside of said can remote from said open end.

5. The hermetically sealed aluminum electrolytic capacitor of claim 1 wherein said anode includes a tantalum anode riser member extending from said anode, and said glass-to-metal seal additionally has a glass member within and bonded to said tantalum outer ring and a tantalum tube embedded through said glass member, said tantalum riser member extending through said tube and sealed thereto at the distal end thereof.

6. A method for hermetically sealing an aluminum electrolytic capacitor comprising providing a capacitor section having an aluminum anode in contact with a liquid electrolyte, mounting said section and said electrolyte within an aluminum can having an open end, filling said open end with a glass-to-metal seal having a tantalum outer ring in contact with said aluminum can, and welding to seal said ring to said can by a continuous annular laser weld.

7. The method of claim 6 wherein said filling additionally includes adjusting the depth of said tantalum ring in said can so that the lip of said can extends beyond said tantalum outer ring prior to said sealing.

* * * * *